United States Patent

[11] 3,629,705

| [72] | Inventor | Ronnie G. Walters<br>Mayfield Heights, Ohio |
|---|---|---|
| [21] | Appl. No. | 851,975 |
| [22] | Filed | Aug. 21, 1969 |
| [45] | Patented | Dec. 21, 1971 |
| [73] | Assignee | Allen-Bradley Company<br>Milwaukee, Wis. |

[54] METHOD AND APPARATUS FOR DETERMINING ANGULAR VELOCITY
10 Claims, 8 Drawing Figs.

[52] U.S. Cl. .................................................. 324/173, 235/189
[51] Int. Cl. .................................................. G01p 3/48
[50] Field of Search .................................................. 324/70, 78 IE, 79, 83 Q; 318/20.705, 20.735; 235/189; 340/263, 271

[56] References Cited
UNITED STATES PATENTS
| 2,947,929 | 8/1960 | Bower | 235/189 |
| 2,994,075 | 7/1961 | Abbott | 340/271 UX |

*Primary Examiner*—Michael J. Lynch
*Attorneys*—Arnold J. Ericsen and Richard C. Steinmetz, Jr.

ABSTRACT: Apparatus is disclosed for determining angular velocity using a resolver and multiplying its stator (orthogonal vector component) signals by signals representing the functions $-\sin Qt$ and $+\cos Qt$, combining the products arithmetically, and demodulating the sum signal. The demodulator output is proportional to the magnitude of angular velocity. For a velocity signal with proper sign, the stators are driven by the signals representing the functions $-\sin Qt$ and $+\cos Qt$ to obtain a signal across a high impedance (constant current) source which, upon compensation for phase shifts introduced by the resolver, is used as a reference in determining the proper sign for a velocity signal. When the stator signals are replaced by orthogonal vector component signals of any vector, rectangular to polar coordinate conversion is achieved. A DC signal proportional to the vector angle is obtained by a circuit which detects the phase difference between the sum signal and the signal representing the function $\cos Qt$.

INVENTOR
RONNIE G. WALTERS
BY Lindenberg & Freilich
ATTORNEYS

INVENTOR
RONNIE G. WALTERS
BY Lindenberg & Freilich

ATTORNEYS

INVENTOR
RONNIE G. WALTERS
BY Lindenberg & Freilich
ATTORNEYS

METHOD AND APPARATUS FOR DETERMINING ANGULAR VELOCITY

This invention relates to electronic apparatus for determining from two vector components a signal proportional to vector magnitude and angle, and to vector magnitude with sign.

It is frequently desirable to receive two signals representing vector components and from them generate a DC output signal proportional to vector magnitude, such as in a system employing a resolver having its rotor attached to a driven shaft to determine angular velocity of the shaft. In the past, commutating DC tachometers, AC generators, and pulse transducers have been employed to measure angular velocity of a shaft.

The commutating DC tachometer usually requires filtering to reduce the noise generated by the commutator, and in many applications this filtering seriously limits the resulting bandwidth. AC generators, on the other hand, use a permanent magnet for the rotor or slip rings which are relatively noise free. However, AC generators suffer from low information rate at low angular velocity. Pulse transducers suffer from the same problem as the AC generators, even though they are capable of generating more information per revolution.

These problems regarding bandwidth and information rate are particularly limiting in feedback systems since feedback systems often require bandwidths in excess of 150 Hz. The detriment to feedback systems is primarily due to the large phase shifts arising from either filtering or low information rates, or both. It would be desirable to obtain angular velocity information from a resolver capable of very wide bandwidth (typically 10 kHz. even at or near zero revolutions per minute. That velocity information may be defined as:

$$(d/dt)\Phi = M + K \sin(\omega t + \delta) \quad (1)$$

where $M$ is a steady-state component of the angular velocity; $\omega$ is the radian frequency of a superimposed sinusoidal component; $K$ is the amplitude of the sinusoidal component; $\delta$ is the phase of $\omega$; and $\Phi$ is the angular position of the resolver rotor. It would sometimes be desirable to generate a signal representing such angular velocity with the proper sign, and for some applications to also provide shaft position data. Other times it would be desirable to generate a signal representing the absolute angular velocity. For still other applications, it is desirable to provide a vector resolver which receives two signals representing orthogonal vector components and from them generates a first DC output signal proportional to vector magnitude and a second DC output signal proportional to the vector angle, thereby effecting a rectangular to polar coordinate conversion.

SUMMARY OF THE INVENTION

In the present invention, two vector components represented by signals $A$ and $B$ are quadrature modulated and combined to obtain a third signal $C$ in accordance with the following equation:

$$C = -A \sin Qt + B \cos Qt \quad (2)$$

where $A$ is equal to $(d/dt)\Phi(\sin \Phi)$, and $B$ is equal to $(d/dt)\Phi(\cos \Phi)$. The peak amplitude of the signal $C$ is proportional to angular velocity of the vector defined by the components $A$ and $B$. A signal proportional to the absolute value of angular velocity $|(d/dt)\Phi|$ is derived by demodulating (rectifying and filtering) the signal $C$. When the signals $A$ and $B$ are provided by a stator of a resolver, $\Phi$ is the angle of the drive shaft of the resolver rotor, and the output signal provides only the magnitude of the angular velocity $(d/dt)\Phi$.

To obtain the angle $\Phi$, the phase of the signal $C$ is compared with the phase of the modulating signal $\sin Qt$ or $\cos Qt$, and a DC signal is produced which is proportional to the phase difference. This is accomplished by providing at least one flip-flop which is set by the zero-crossover in a given direction of one signal and reset by the zero-crossover in the same direction of the other signal. When the flip-flop is set, it activates a switch to connect a reference voltage to an averaging integrator, thereby providing at the output of the integrator a DC signal proportional to the phase difference which is directly related to the desired phase angle $\Phi$. In that manner, both the magnitude and phase angle of a vector are determined for rectangular to polar coordinate conversion of the vector signals $A$ and $B$.

To obtain a DC signal proportional to the angular velocity $(d/dt)\Phi$ of a shaft with proper sign for direction of rotation, an electromagnetic rotor of a resolver is driven by the shaft and excited by a high impedance current source. Stator windings of the resolver are excited by the modulating signals $-\sin Qt$ and $+\cos Qt$ employed to derive the aforesaid signal $C$. An AC signal $D$ is thus obtained across the current source equal to $\cos(\Phi_0 + Qt)$. A product $C \cdot D$ is then formed and demodulated to provide for a signal equal to the absolute value of angular velocity $|(d/dt)\Phi|$ and a proper sign. Apparatus is provided to eliminate the effects of phase shifts in the coupling through the stator employed to form the signal $D$.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
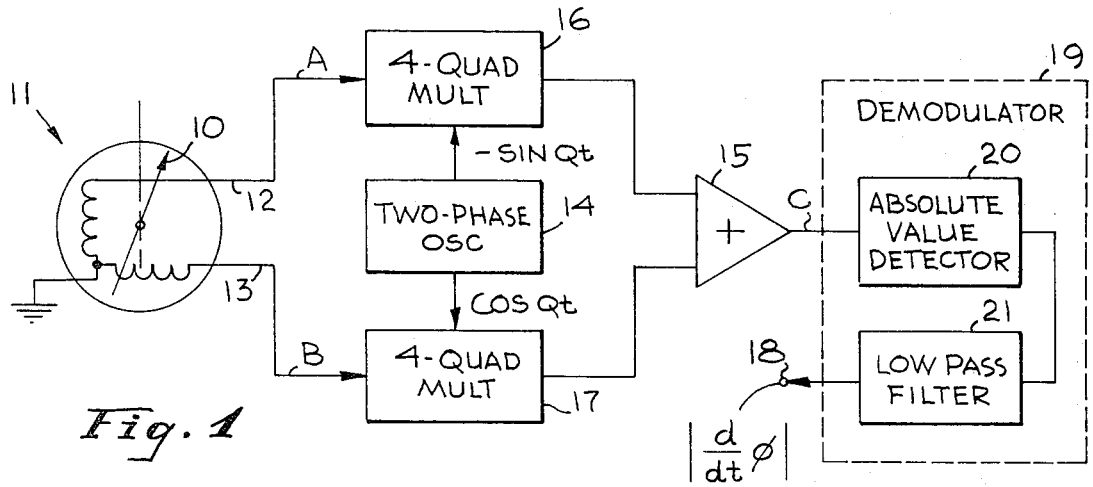
FIG. 1 illustrates a system for generating a signal proportional to the absolute angular velocity of a shaft driving a rotor of a resolver.

Referring to FIG. 1, a system is disclosed for generating a signal proportional to the absolute angular velocity of a shaft (not shown) connected to drive a rotor 10 of a resolver 11. The system is capable of operating with a very wide bandwidth (10 kHz. with a typical resolver) and without commutation problems because the resolver may use a permanent magnet for the rotor or an electromagnet energized by a DC current source through slip rings.

The stator of the resolver 11 has two output terminals 12 and 13 at which the respective signals $A$ and $B$ appear as functions of shaft or rotor angle $\Phi$, as given by the following equations:

$$A = (d/dt)\Phi (\sin \Phi) \quad (3)$$
$$B = (d/dt)\Phi (\cos \Phi) \quad (4)$$

The signals $A$ and $B$ are quadrature modulated by respective signals representing $-\sin Qt$ and $+\cos Qt$ from a two-phase oscillator 14 and combined by a conventional summing amplifier 15 to generate a signal $C$ in accordance with the foregoing equation (2). The modulation functions are carried out by four-quadrant multipliers 16 and 17 of conventional design.

By substituting for $A$ and $B$ in equation (2) the respective values from equations (3) and (4), and collecting the terms, the value of $C$ is found to be:

$$C = (d/dt)\Phi \cos(\Phi_0 + Qt) \quad (5)$$

From equation (1), a value for $\Phi_0$ is found to be:

$$\phi_{(t)} = \int_0^t M + K \sin(\omega t + \delta) dt$$

$$= Mt + \frac{K}{\omega}[\cos \delta - \cos(\omega t + \delta)]$$

Substituting that value for $\Phi_{(t)}$ in equation (5) yields the following equation:

$$C=(d/dt)\Phi \cos [(Q+M)t-(K/\omega) \cos (\omega t+\delta)+(K/\omega) \cos \delta]$$
(6)

That equation shows that the signal $C$ at the output of the summing amplifier 15 is an AC signal with a peak amplitude proportional to angular velocity.

Upon examining the frequency of the signal $C$ as given by equation (6), it is seen that the "instantaneous" frequency is given by $$F=(d/dt) [(Q+M)t-(K/\omega) \cos (\omega t+\delta)+(K/\omega) \cos \delta]$$
$$=(Q+M)+K \sin (\omega t+\delta)$$

The signal $C$ is therefore a frequency modulated carrier with a peak $\Delta F$ equal to $K$ and a modulating frequency $\omega$, where $M$, $\omega$, $K$ and $\delta$ are as defined with reference to equation (1). The amplitudes of the sidebands are solutions of Bessel functions of the first kind, where $x=K/\omega$. An approximate relationship of frequency range ($FR$) to $x$ may be determined by neglecting sidebands with amplitudes less than 1 percent of the carrier. Consulting a tabulation of Bessel functions of the first kind for the highest order solution, multiple ($N$) of $\omega$, which produces $J_N(x)$AHS0.01, it is seen $$FR \cong 2K+4\omega|_{x>.5}$$
$$FR \cong 2(K+\omega)|_{x<.5}$$

In applications involving unidirectional rotation at high velocity, advantage may be taken of this by maintaining the positive sign of $M$ (steady state component of the angular velocity), thereby providing a lower limit on the carrier frequency $Q$ of the signal $C$. The carrier frequency $Q$ is selected at the oscillator 14 to be $$\gg \left(|M|+\frac{FR}{2}\right)_{max}$$

The signal $C$ is demodulated by a demodulator 19 comprising an absolute value circuit 20 and a low-pass filter 21 to provide at an output terminal 18 a signal proportional to the absolute angular velocity $(d/dt)\Phi$.

Figure 2:
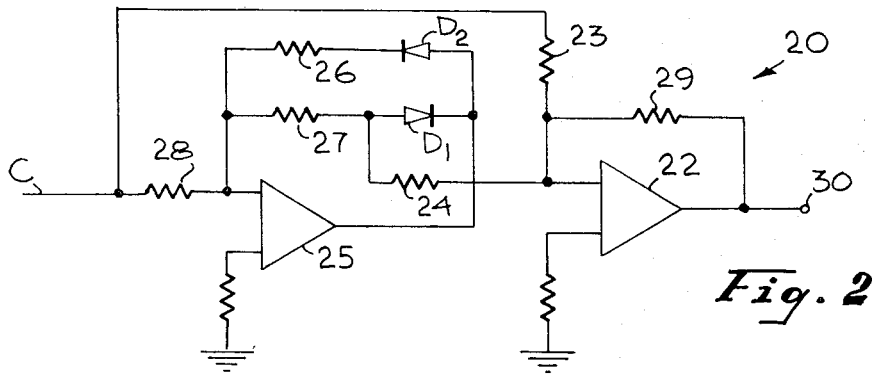
FIG. 2 illustrates a circuit diagram of an absolute value detector for the systems of FIGS. 1 and 4.

The circuit 20 is illustrated in FIG. 2 as comprising an operational amplifier 22 which receives the signal $C$ directly through one summing resistor 23. Another summing resistor 24 is connected to the signal $C$ through a conventional precision rectifier (half-wave) comprising an operational amplifier 25 and oppositely poled diodes $D_1$ and $D_2$ in the feedback loops to decrease nonlinearity to a very small value. Feedback resistors 26 and 27 are selected to be equal to an input resistor 28 to provide half-wave rectification without amplification. Thus the peak signal at the input resistor 24 of the operational amplifier 22 is equal to the peak of the signal $C$. The inverted positive half-cycles of the signal $C$ coupled by the resistor 24 are multiplied by a factor of two by selecting a feedback resistor 29 to have twice the resistance of the resistor 24. At the summing junction of the operational amplifier 22 the uninverted positive half-cycles are subtracted from the inverted half-cycles of twice the amplitude (because resistor 23 equals resistor 29). The result is inverted and appears at an output terminal 30 as a full-wave rectification of the signal $C$. Thus the absolute value circuit functions as a precision full-wave rectifier.

The filter 21 is a low-pass filter of order $N$ and is chosen with a sufficiently low $\omega_c$ to minimize carrier ripple to a level tolerated by the system requirements, where $\omega_c$ is the system bandpass. The system frequency response $R_{(\omega)}$ is $$R_{(\omega)} \cong \frac{1}{\left(\frac{\omega^2}{\omega_c^2}+1\right)^{\frac{N}{2}}}, \quad -N \tan^{-1} \frac{\omega}{\omega_c}$$

for multiple poles on the real axis.

Figure 3:
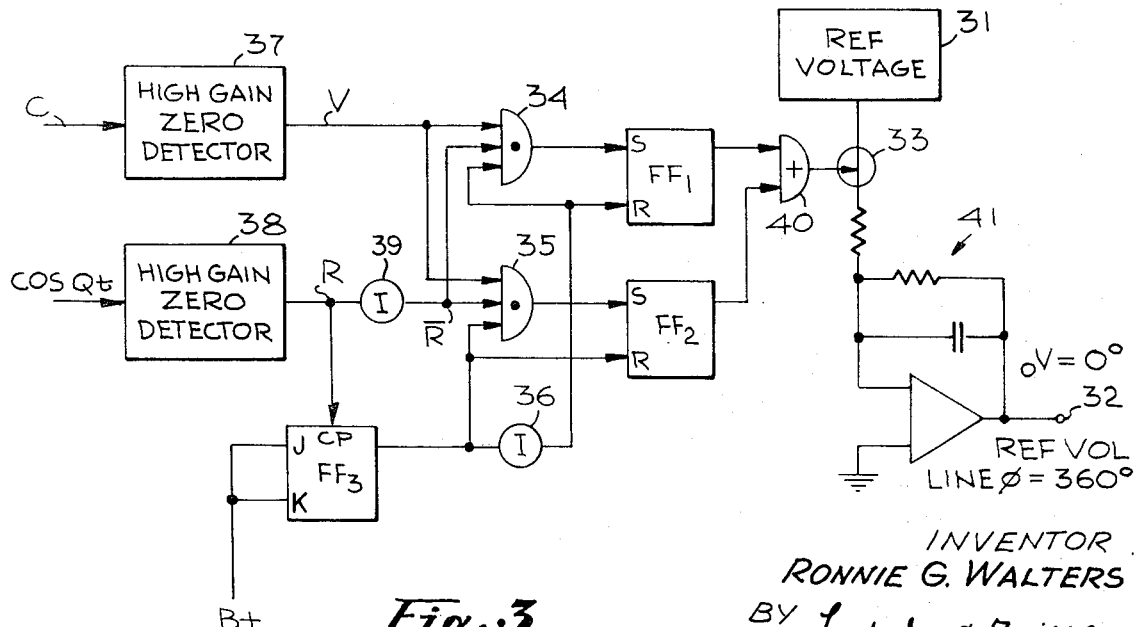
FIG. 3 illustrates a system which, when used with the system of FIG. 1 to accept signals representing components of any vector, will effect rectangular to polar coordinate conversion.

The system shown in FIG. 1 will function as a rectangular to polar coordinate converter when provided with two signals $A$ and $B$ representing orthogonal vector components. The system of FIG. 3 provides the vector angle to complete the polar coordinate data. A signal from zero to some reference voltage established by a voltage source 31 is provided at an output terminal 32 proportional to the vector angle from $\Phi=0°$ $\Phi<360°$ (lim $\Phi=360°$). That is basically accomplished by detecting the phase difference between the signal $C$ from the output of the amplifier 15 (FIG. 1) and the modulating signal $\cos Qt$ from the input of the multiplier 16 (FIG. 1), and closing a switch 33 a period of the time of each cycle of the signal $\cos Qt$ in proportion to the magnitude of the phase difference.

A pair of R-S flip-flops $FF_1$ and $FF_2$ are set through respective AND-gates 34 and 35, and reset by a J-K flip-flop $FF_3$, directly in the case of the flip-flop $FF_2$ and through an inverter 36 in the case of the flip-flop $FF_3$. High gain zero detectors 37 and 38 convert the sinusoidal signals $C$ and $\cos Qt$ into square waves to provide discrete logic levels for the AND-gates 34 and 35 (via an inverter 39 in the case of the detector 38).

Figure 4:
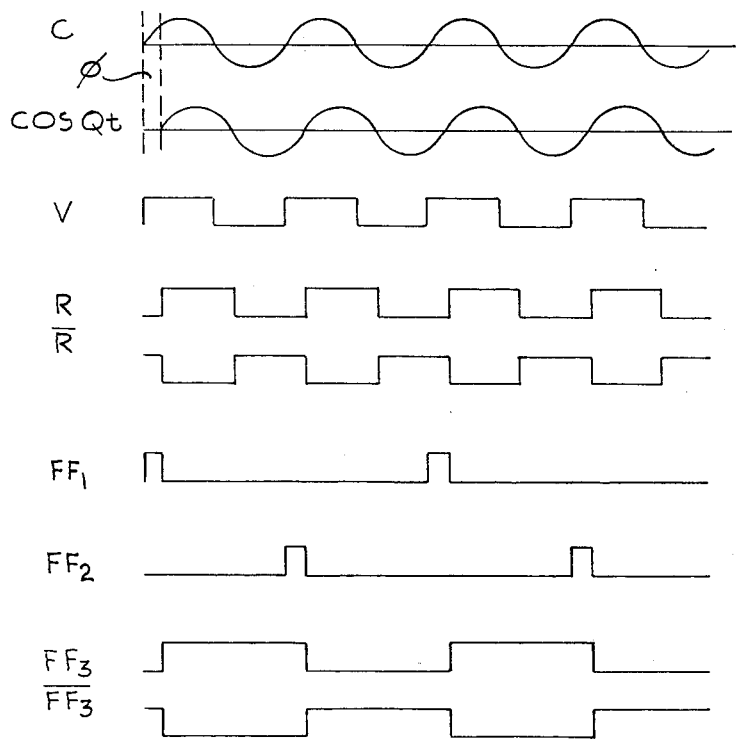
FIG. 4 is a timing diagram of signals at designated points of the system of FIG. 3 useful in understanding the operation of the system.

In practice, each detector may be a high gain, saturating amplifier or any other circuit that converts the signals $C$ and $\cos Qt$ into respective signals $V$ and $R$ as shown in FIG. 4. The J-K flip-flop $FF_3$ is set and reset by each positive going transition of the signal $R$.

From the timing diagram of FIG. 4 it may be seen that the logic equations for the flip-flops $FF_1$ and $FF_2$ are as follows:
$$_1FF_1=V\cdot R\cdot \overline{FF_3}$$
$$_0FF_1=FF_3$$
$$_1FF_2=V\cdot R\cdot FF_3$$
$$_0FF_2=\overline{FF_3}$$

Thus each of the flip-flops is set when the product $V\cdot R$ is true at the start of each cycle of the signal $C$, but alternately as controlled by the flip-flop $FF_3$, and then reset at the start of each cycle of the signal $\cos Qt$.

The true output terminals of the flip-flops $FF_1$ and $FF_2$ are connected to the switch 33 by an OR-gate 40. In that manner the switch 33 connects the reference voltage from the source 31 to an averaging integrator 41 for a period of each cycle of the signal $C$ proportional to the phase difference between the signal $C$ and the signal $\cos Qt$. The signal at the output terminal 32 is therefore proportional to the angle $\Phi$ of the vector, the absolute amplitude $|(d/dt)\Phi|$ of which is represented by the signal at the output terminal 18 of FIG. 1.

Referring back to the system of FIG. 1 as shown, the system provides velocity magnitude only. Examining the phase of the signal $C$ with respect to the signal $\cos Qt$, it is seen that the sign of the angular velocity $(d/dt)\Phi$ is dependent on both the phase of the signal $C$ and the shaft angle $\Phi$ which is unknown without the circuit of FIG. 3. Once the angle $\Phi$ is known, the sign can be determined and applied to the signal at the output terminal 18 of FIG. 1 to provide a signal representing angular velocity with the proper sign.

Figure 5:
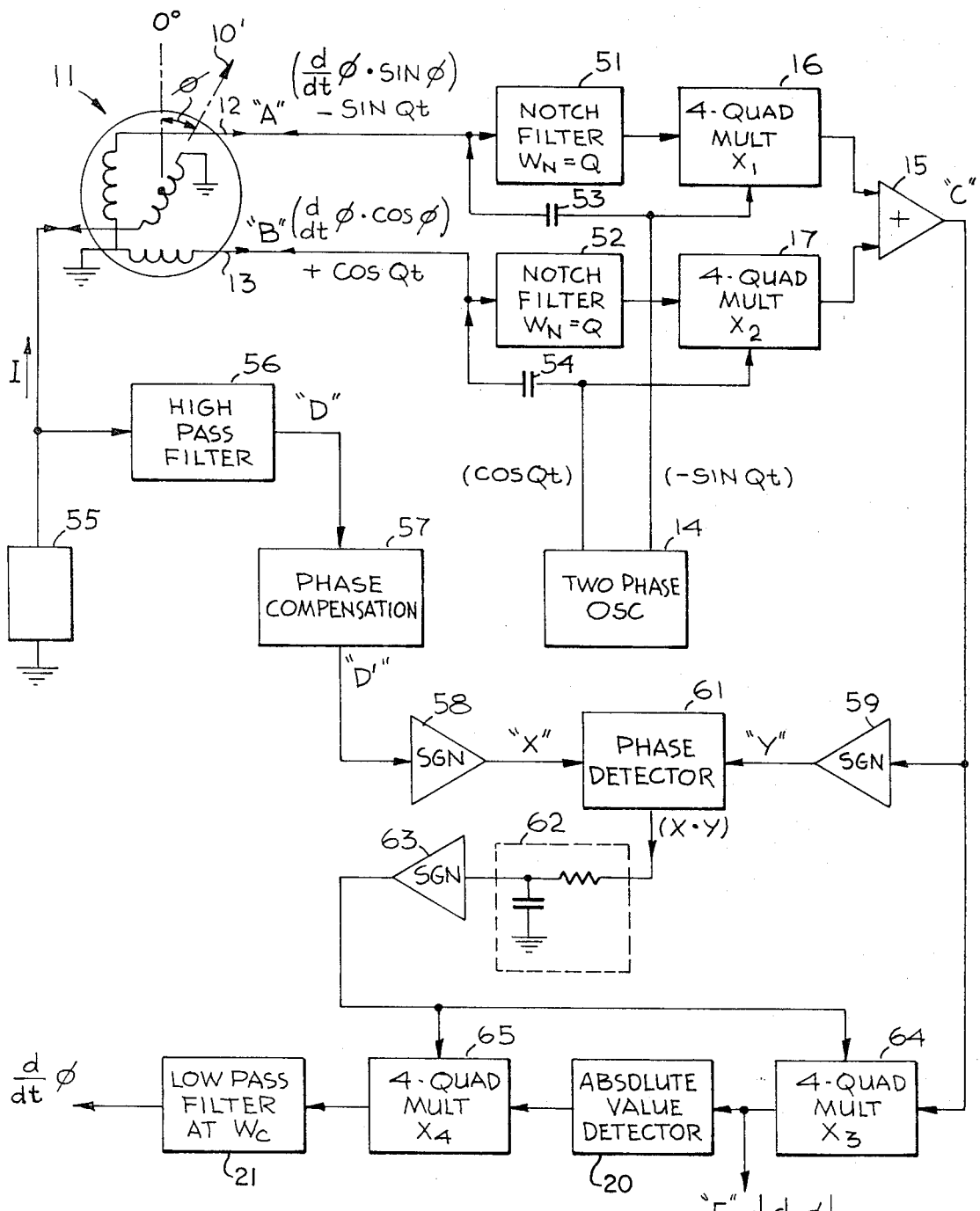
FIG. 5 illustrates a system for generating a signal proportional to the angular velocity of a shaft driving a rotor of a resolver, and with a sign corresponding to the direction of rotation.

FIG. 5 illustrates a system for generating a signal proportional to angular velocity with the proper sign without expressly determining the angle $\Phi$. This is accomplished by driving the stator output terminals 12 and 13 with the quadrature output signals of the oscillator 14. For convenience in relating this system to the basic system of FIG. 1, the components common to both are referred to by the same numerals.

Notch filters 51 and 52 couple the stator terminals 12 and 13 to the multipliers 16 and 17 to isolate the signals $A$ and $B$ coupled to the multipliers 16 and 17 while the modulating signals $-\sin Qt$ and $+\cos Qt$ are transmitted through coupling capacitors 53 and 54 to the stator terminals 12 and 13. The input impedance of each notch filter is made large enough so that when driven parallel with the associated coupling capacitor by the stator's characteristic impedance, the resulting bandwidth is much greater than $\omega_{max}$, and no resonance appears in the vicinity of $Q$. This prevents large changes in phase shift through the system caused by the varying inductance presented by the moving rotor 10' which is excited by a DC current source 55.

A high pass filter 56 transmits a signal $D$ from the rotor 10'. As in the modulating channels, the impedance seen by the system at the output of the filter 56 must not be resonant near $Q$, and the current source 55 must provide a high impedance load at $Q$.

The signal $D$ is given by the following equation:

$$D = \cos(\Phi_0 + Qt) \quad (7)$$

Recalling from equation (5) the value of $C$, the product $C \cdot D$ may be written as follows:

$$C \cdot D = \tfrac{1}{2}(d\Phi/dt)[1 + \cos 2(\Phi_0 + Qt)] \quad (8)$$

When demodulated, that product signal would produce a DC level equal to $\tfrac{1}{2}(d\Phi/dt)$. When scaled, the signal is then the desired angular velocity signal $(d\Phi/dt)$ with the proper sign. However, at high carrier frequencies, most resolvers would cause a considerable phase shift in the signal $D$ which varies slightly with shaft angle $\Phi$. The steady-state component of that phase shift is compensated for by a phase compensating network 57. The compensated signal is then given by:

$$D' = \cos(Qt + \Phi_0 + \lambda) \quad (9)$$

where $\lambda$ is the varying component of the phase shift caused by changing resolver parameters, after compensation of the steady-state component has been provided by the network 57. Substituting $D'$ for $D$ in the product signal $C \cdot D$ of equation (8) produces the following product:

$$C \cdot D' = (d/dt)\Phi \tfrac{1}{2}[\cos \lambda + \cos(2Qt + 2\Phi_0 + \lambda)]$$

This would cause an error in the output function because $\lambda$ is a function of $\Phi$, meaning that it will fall within the system bandpass $\omega_c$.

The effects of $\lambda$ on the product $C \cdot D'$ are eliminated by introduction of new functions of $D'$ and $C$ as follows:

$$X = SGN(D') = SGN[(d/dt)\Phi \cos(\Phi_0 + Qt + \lambda)] \quad (10)$$
$$Y = SGN(C) = SGN[(d/dt)\Phi \cos(\Phi(t) + Qt)] \quad (11)$$

The new functions of equations (10) and (11) are introduced by $SGN$ circuits 58 and 59.

Figure 6:
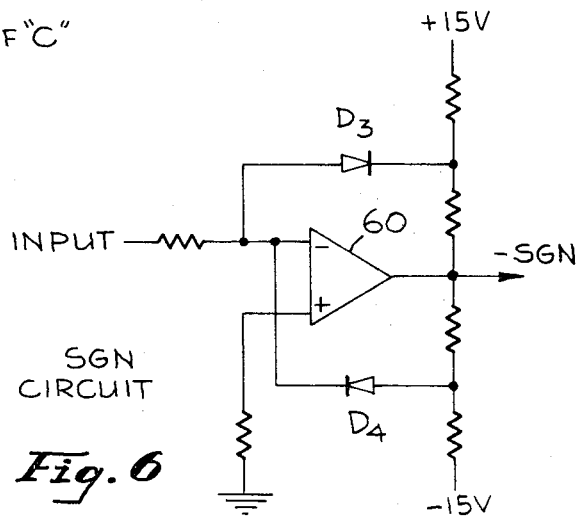
FIG. 6 illustrates a circuit diagram of sign detectors for the system of FIG. 5.

Each $SGN$ circuit is as shown in FIG. 6. It comprises an operational amplifier 60 fully clamped by diodes $D_3$ and $D_4$ to function in a known manner as a voltage comparator according to the following table:

| INPUT | OUTPUT | FUNCTION |
| --- | --- | --- |
| $X > 0$ | $-5V$ | $SGNX = +1$ |
| $X = 0$ | 0 | $SGNX = 0$ |
| $X < 0$ | $+5V$ | $SGNX = -1$ |

A phase detector 61 connected to the $SGN$ circuits 58 and 59 provides a signal $(X \cdot Y)$ as follows:

$$X \cdot Y = SGN\left[\frac{1}{2}\frac{d\phi}{dt}(\cos \lambda + \cos[2(Qt + \phi t) + \lambda])\right]$$

Figure 7:
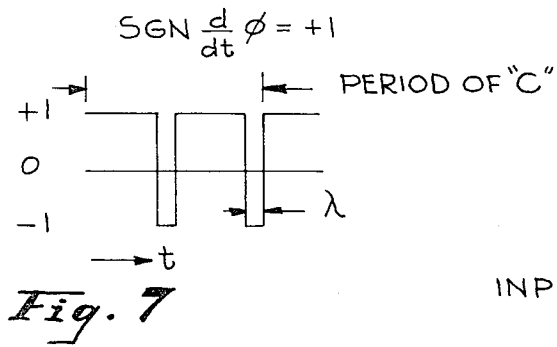
FIGS. 7 and 8 are waveform diagrams useful in understanding the operation of the system of FIG. 6.
Figure 8:
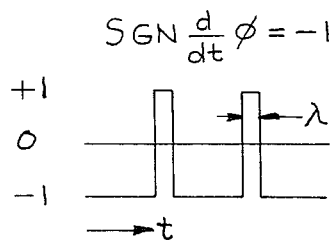

When $SGN(d/dt)\Phi = +1$, the output of the detector 61 appears as in FIG. 7, and when $SGN(d/dt)\Phi = -1$, the output of the detector 61 appears as in FIG. 8. The negative and positive going pulses in the positive and negative signals of FIGS. 7 and 8, respectively, appear due to uncompensated phase shifts introduced by the stator coupling of the resolver 11 employed to form the signal $D'$. By proper selection of the RC time constant for an averaging integrator 62, the pulses are sufficiently attenuated at the input of a $SGN$ circuit 63 to prevent zero-crossover. In that manner the proper sign signal appears at the output of the $SGN$ circuit 63 without interruption.

The sign signal from the $SGN$ circuit 63 is coupled to two four-quadrant multipliers 64 and 65. The first multiplier 64 provides an alternating signal product $E$ given by the following equation to eliminate an ambiguity inherent in the signal $C$ caused by the direction of rotation of angle $\Phi$.

$$E_{(t)} = SGN(d/dt) \cdot C_{(t)} = |(d/dt)\Phi| \cos(\Phi_0 + Qt)$$

The phase shift of the signal $E$ with respect to $\cos Qt$ is the shaft angle $\Phi$ for any nonzero angular velocity. Therefore, a phase detector may be employed as in FIG. 3 to obtain a signal proportional to shaft angle $\Phi$ if desired. For zero velocity shaft angle $\Phi$, it would be necessary to simply modulate the current source which drives the rotor 10'.

For a signal proportional to angular velocity $(d/dt)\Phi$ with proper sign, demodulation of the signal $E$ is accomplished as in FIG. 1 for the signal $C$ except that the output of the absolute value detector 20 is multiplied by $SGN(d/dt)\Phi$ by the multiplier 65. The product $E(SGN(d/dt)\Phi)$ then produces the desired signal $(d/dt)\Phi$ which is proportional to the angular velocity of the rotor 10' and is of a polarity which depends upon the direction of rotation.

The embodiments of the invention in which an exclusive property or privilege is claimed are defined as follows:

1. A method for determining the angular velocity of a rotor in a resolver having a stator which produces output signals $A$ and $B$ of respective amplitudes $(d/dt)\Phi \sin \Phi$ and $(d/dt)\Phi \cos \Phi$, where $\Phi$ is the angular position of said rotor comprising the steps of modulating said signals $A$ and $B$ by the functions $-\sin Qt$ and $+\cos Qt$, respectively, to form alternating current signals representing the products $-A \sin Qt$ and $+B \cos Qt$, where $Q$ is a constant frequency and $t$ is time, combining the modulated signals to form a third signal $C$ equal to the sum of the products $-A \sin Qt$ and $+B \cos Qt$, and demodulating the signal $C$, thereby providing a direct current signal proportional to the absolute value of angular velocity of said rotor.

2. A method for determining the angular velocity of a rotor in a resolver as defined in claim 1, wherein said rotor is an electromagnet having an excitation winding, further comprising the steps of exciting said rotor with direct current from a high impedance source, exciting said stator at output terminals thereof with the signals by which output signals thereat are being modulated to obtain said third signal $C$, thereby developing a fourth signal $D$ representing the function $\cos(\Phi_0 + Qt)$ across said excitation winding, multiplying said fourth signal $D$ by said third signal $C$ to form a fifth signal $C \cdot D$, and demodulating said fifth signal to provide a signal proportional to angular velocity with proper sign.

3. A method as defined by claim 2 wherein said fourth signal $D$ is compensated for a steady-state component of phase shift in said resolver to provide a signal $D'$ representing the function $\cos(Qt + \Phi_0 + \lambda)$, where $\lambda$ is the varying component of the phase shift caused by changing resolver parameters, operating on each of the signals $C$ and $D'$ separately to form square waves that are positive for signal amplitudes greater than zero and negative for signal amplitudes less than zero, detecting the phase difference between said square waves to provide a resulting signal that is greater than zero for a phase difference of one polarity, and less than zero for a phase difference of another polarity, and operating on the resulting signal representing that phase difference to provide for said signal proportional to angular velocity a sign signal that is positive when the resulting signal is greater than zero and is negative when the resulting signal is less than zero.

4. A method as defined by claim 3 further comprising the steps of multiplying the third signal $C$ by said sign signal to provide an alternating signal $E$, demodulating the signal $E$ by rectifying and filtering, and multiplying the demodulated signal $E$ by said sign signal to provide as an output signal a signal proportional to angular velocity with proper sign.

5. A method as defined by claim 4 including the steps of averaging said resulting signal before operating on said resulting signal to provide said sign signal, thereby eliminating effects of uncompensated phase shifts of said stator coupling.

6. Apparatus for determining the angular velocity of a rotor in a resolver having a stator which produces output signal $A$ and $B$ of respective amplitudes $(d/dt)\Phi \sin \Phi$ and $(d/dt)\Phi \cos \Phi$, where $\Phi$ is the angular position of said rotor, comprising:

means for generating first and second synchronized signals representing respective functions $-\sin Qt$ and $+\cos Qt$, where $Q$ is a constant frequency and $t$ is time;

means for multiplying said signal $A$ by said first signal to obtain a third signal representing the value $-A \sin Qt$;

means for multiplying said signal $B$ by said second signal to obtain a fourth signal representing the value $+B \cos Qt$;

summing means for adding said third and fourth signals to obtain a fifth signal representing the value $-A \sin Qt + B \cos Qt$;

rectifying means connected to said summing means for receiving said fifth signal and providing a sixth signal proportional to the absolute value of said fifth signal; and filtering means connected to said rectifying means for receiving said sixth signal and providing a direct current signal the amplitude of which is proportional to the absolute value of angular velocity of said rotor.

7. Apparatus as defined in claim 6 wherein said rotor is an electromagnet having an excitation winding, said apparatus including a system for determining a proper sign for direction of rotation of said rotor, comprising:

a high impedance direct current source connected to said excitation winding of said rotor;

means for exciting said stator windings at said output terminals at which said signals $A$ and $B$ are provided with the respective signals by which output signals thereat are being multiplied to obtain said fifth signal, thereby developing a seventh signal across said excitation winding representing the function $\cos(\Phi_{0}+Qt)$; and means responsive to said fifth signal and said compensated seventh signal for producing, in cooperation with said rectifying and filtering means, said direct current signal to represent the absolute value of angular velocity and direction of rotation of said rotor.

8. Apparatus as defined in claim 7 wherein said last named means comprises:

means for operating on said fifth signal to form a first square wave that is positive for signal amplitudes greater than zero and negative for signal amplitudes less than zero;

means for operating on said seventh signal to form a second square wave that is positive for signal amplitudes greater than zero and negative for signal amplitudes less than zero;

means for detecting the phase difference between said first and second square waves to provide a resulting signal of a polarity indicative of the phase relationship of said fifth signal to said seventh signal; and output means responsive to said fifth signal and said resulting signal to provide, in cooperation with said rectifying and filtering means, said direct current signal representing the angular velocity and direction of rotation of said rotor.

9. Apparatus as defined in claim 8 including means for compensating said seventh signal for a steady state component of phase shift in said resolver to produce said seventh signal according to the function $(Qt+\Phi_{0}+\lambda)$, where $\lambda$ is the varying component of the phase shift by changing resolver parameters.

10. Apparatus as defined in claim 9 wherein said output means comprises:

means for filtering out the effects of varying phase shift $\lambda$ on said resulting signal to provide a filtered resulting signal;

means connected to the output of said filtering means for producing a sign signal of zero volts when the phase difference between said fifth signal and said compensated signal is zero and said filtered resulting signal is zero volts, a sign signal of a predetermined amplitude and given polarity when said phase difference is of a given polarity and said filtered resulting signal is of a given voltage polarity, and a sign signal of said predetermined amplitude and a voltage polarity opposite said given voltage polarity when said phase difference is of a polarity opposite said given polarity and said filtered resulting signal is of a voltage polarity opposite said given voltage polarity;

means for multiplying said fifth signal by said sign signal to provide an eighth signal that eliminates ambiguity in said fifth signal caused by the direction of rotation of said rotor angle;

means for rectifying said eighth signal to obtain a ninth signal representing the absolute value of said eighth signal;

means for multiplying said ninth signal by said sign signal to obtain an output product signal; and means for filtering said output product signal.

* * * * *

UNITED STATES PATENT OFFICE
CERTIFICATE OF CORRECTION

Patent No. 3,629,705　　　Dated December 21, 1971

Inventor(s) Ronnie G. Walters

It is certified that error appears in the above-identified patent and that said Letters Patent are hereby corrected as shown below:

| | | |
|---|---|---|
| Column 1, Line 30 | "(typically 10 kHz." should read --(typically 10 kHz.)-- |
| Column 2, Line 6 | "(d/dt" should read --(d/dt)-- |
| Column 3, Line 22 | "$J_N(x)$AHSO.01" should read --$J_N(x) > .01$-- |
| Column 3, Line 22 | After "seen" insert --that-- |
| Column 4, Line 3 | After "$\phi=0°$" insert --to-- |
| Column 4, Line 13 | "$FF_3$" should read --$FF_1$-- |
| Column 5, Line 19 | "d/dt)" should read --(d/dt)-- |
| Column 5, Line 45 | "$\phi t$" should read --$\phi(t)$-- |

Signed and sealed this 29th day of August 1972.

(SEAL)
Attest:

EDWARD M. FLETCHER, JR.　　　　　　ROBERT GOTTSCHALK
Attesting Officer　　　　　　　　　Commissioner of Patents